(12) United States Patent
Xue et al.

(10) Patent No.: US 9,698,889 B2
(45) Date of Patent: Jul. 4, 2017

(54) SCHEDULING IN A MULTIPLE USER MULTIPLE-INPUT AND MULTIPLE OUTPUT COMMUNICATIONS NETWORK

(71) Applicant: INTEL CORPORATION, Santa Clara, CA (US)

(72) Inventors: Feng Xue, Redwood City, CA (US); Yuan Zhu, Beijing (CN); Hooman Shirani-Mehr, Portland, OR (US); Roya Doostnejad, Los Altos, CA (US); Qinghua Li, San Ramon, CA (US); Masoud Sajadieh, Fremont, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/494,857

(22) Filed: Sep. 24, 2014

(65) Prior Publication Data

US 2016/0088648 A1    Mar. 24, 2016

(51) Int. Cl.
*H04W 72/12*    (2009.01)
*H04B 7/06*    (2006.01)
(Continued)

(52) U.S. Cl.
CPC ......... *H04B 7/0639* (2013.01); *H04B 7/0452* (2013.01); *H04L 1/06* (2013.01); *H04B 7/0632* (2013.01)

(58) Field of Classification Search
CPC ..... H04L 47/10; H04L 43/50; H04L 12/2697; H04L 43/0852; H04L 43/00
See application file for complete search history.

(56) References Cited

U.S. PATENT DOCUMENTS 5,920,701 A * 7/1999 Miller ................... H04L 1/1614
709/228
2010/0157924 A1    6/2010 Prasad et al.
(Continued)

FOREIGN PATENT DOCUMENTS

EP    2373109 A1    10/2011

OTHER PUBLICATIONS

3GPP TR 25.996, "Spatial channel model for Multiple Input Output (MIMO) simulations", Sep. 2012, Version 11.0.0, Release 11, 40 pages.
(Continued)

*Primary Examiner* — Maharishi Khirodhar
*Assistant Examiner* — Sanjay K Dewan
(74) *Attorney, Agent, or Firm* — Thorpe North & Western

(57) ABSTRACT

A technology that is operable to schedule data transfer for a multiple user multiple-input and multiple-output (MU-MIMO) communications network is disclosed. In one embodiment, an enhanced node B (eNode B) is configured with circuitry configured to receive a sounding signal from each of a plurality of user equipment (UEs). One or more major paths of the sounding signals from each of the plurality of UEs are determined. An angle of arrival (AoA) is determined that is associated with each of the one or more major paths. The plurality of UEs are grouped into one or more candidate MU-MIMO sets using the AoAs associated with each of the one or more major paths. Data transmissions are scheduled for one or more of the candidate UEs of the candidate MU-MIMO set on one or more of the major paths of each of the candidate UEs.

20 Claims, 13 Drawing Sheets

(51) Int. Cl.
*H04B 7/08* (2006.01)
*H04B 7/04* (2017.01)
*H04B 7/0452* (2017.01)
*H04L 1/06* (2006.01)

(56) References Cited

U.S. PATENT DOCUMENTS

| | | | | |
|---|---|---|---|---|
| 2010/0323612 A1* | 12/2010 | Xu | H04B 7/022 | 455/7 |
| 2011/0053604 A1* | 3/2011 | Kim | H04W 16/16 | 455/450 |
| 2011/0194593 A1* | 8/2011 | Geirhofer | H04W 72/048 | 375/224 |
| 2011/0207494 A1* | 8/2011 | Zhu | H04B 7/024 | 455/509 |
| 2011/0267972 A1* | 11/2011 | Yoon | H04L 5/0023 | 370/252 |
| 2012/0076028 A1* | 3/2012 | Ko | H04L 1/0026 | 370/252 |
| 2014/0050280 A1* | 2/2014 | Stirling-Gallacher | H04B 7/0486 | 375/296 |
| 2014/0092819 A1 | 4/2014 | Du et al. | | |
| 2014/0293803 A1* | 10/2014 | Wang | H04W 24/02 | 370/252 |
| 2014/0314004 A1* | 10/2014 | Zhou | H04L 5/0055 | 370/329 |
| 2015/0282122 A1* | 10/2015 | Kim | H04L 25/03898 | 370/329 |
| 2015/0319633 A1* | 11/2015 | Ji | H04W 24/08 | 370/252 |

OTHER PUBLICATIONS

Tse et al, "Fundamentals of Wireless Communication", 2005, 582 pages, Cambridge University Press.

* cited by examiner

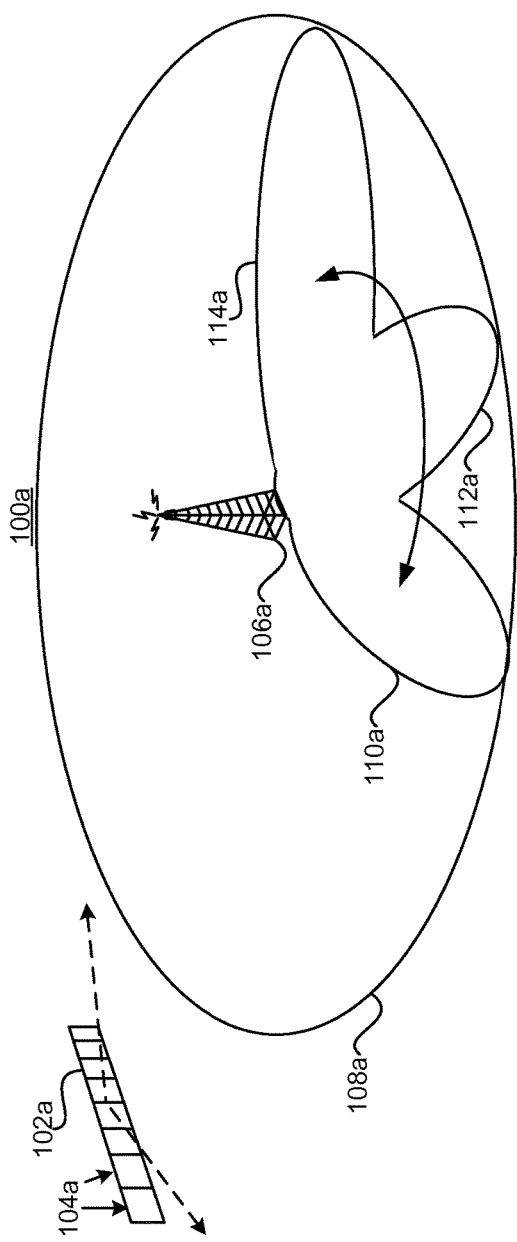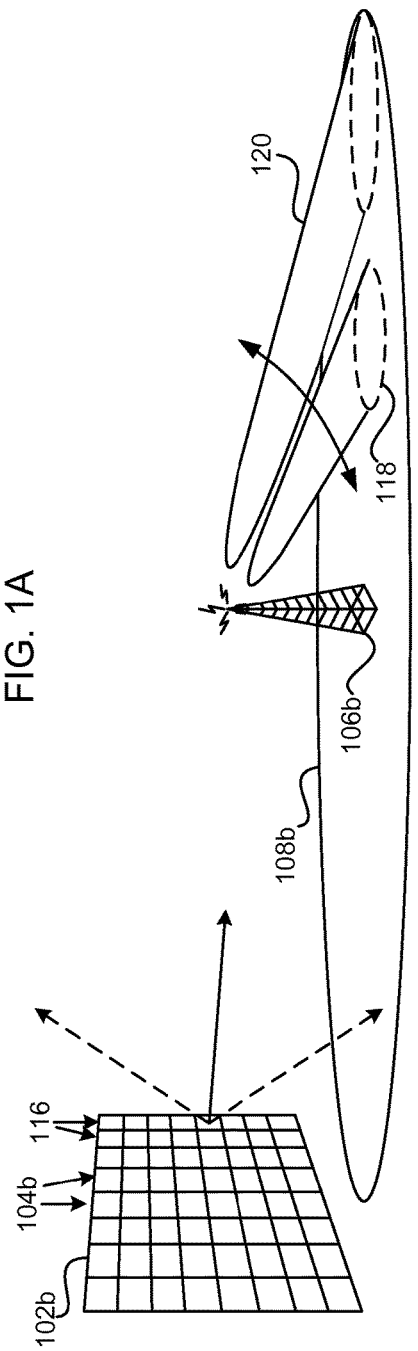

| UE ID | AoA 1 | AoA 2 | AoA 3 | AoA 4 |
|---|---|---|---|---|
| UE 1 | 15° - 25° | 45°- 55° | 105° - 125° | 15° - 25° |
| ... | | | | ... |
| UE (U) | 35° - 45° | 85°- 85° | n/a | n/a |

FIG. 5

SCHEDULING IN A MULTIPLE USER MULTIPLE-INPUT AND MULTIPLE OUTPUT COMMUNICATIONS NETWORK

BACKGROUND

To achieve an increased data throughput and link reliability, data communicated between a node and a user equipment (UE) in a communications network can be spread over multiple antennas of an antenna array. The antenna array can be used to achieve an array gain that improves a spectral efficiency and a diversity gain that increases the link reliability of the communications network. In a multiple-input multiple-output (MIMO) system or a multiple-input single-output (MISO) system, transmitters and/or receivers include multiple antennas to communicate data. A MIMO system can be used to increase data throughput and link reliability of a network without increasing bandwidth frequencies or increasing transmit power of the network.

Massive MIMOs can deploy a large number of elements in antenna arrays. In a single-user MIMO (SU-MIMO) scheme, all MIMO streams from a node in the communications network are assigned to a single UE at a time. A multiple-user MIMO (MU-MIMO) supports data transmissions to a plurality of UEs on the same time-frequency resource of one node. However, overhead of the MU-MIMO system can reduce the overall gain of the MU-MIMO transmitting data to a plurality of UEs on the same frequency.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 1A depicts a one dimensional (1D) antenna array in a two dimensional (2D) multiple-input and multiple-output (MIMO) system in accordance with an example;

FIG. 1B depicts a 2D antenna array in a three dimensional (3D) or full dimensional (FD) MIMO system in accordance with an example;

FIG. 5 shows a table of angles of arrival (AoAs) of major paths of UEs in accordance with an example;

Figure 2A:
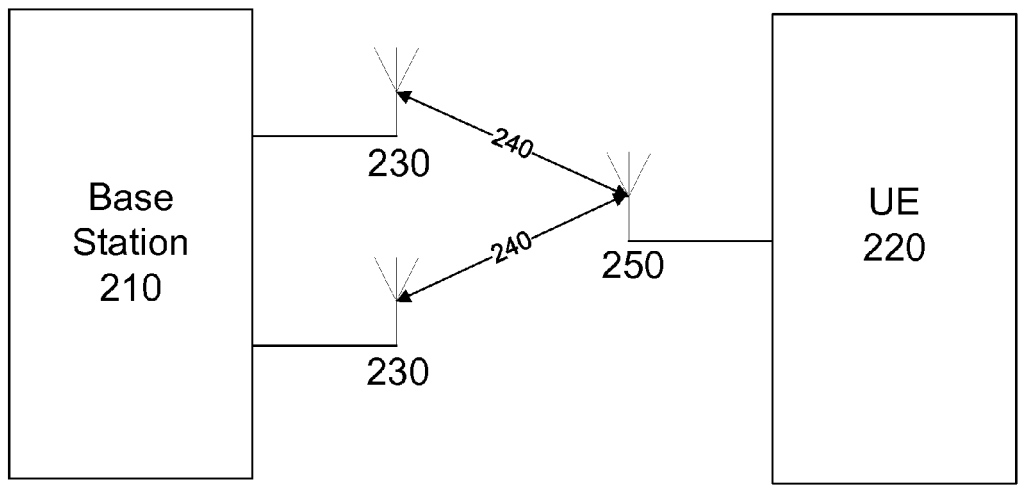
FIG. 2A illustrates a single-user multiple-input single-output (SU-MISO) configuration in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

In a communications network, throughput can be affected by both a signal strength and an interference level of nodes. The throughput of the communications network can be increased by balancing a ratio between the signal strength and the interference level of the nodes in the communications network. In one embodiment, beamforming can be used to balance signal strength and interference levels for the nodes in the communications network. Beamforming can be used for an antenna array to direct or control signal transmission directions.

In one embodiment, the communications network can be a cellular network. The cellular network can be configured to operate based on a cellular standard, such as the third generation partnership projection (3GPP) long term evolution (LTE) Rel. 8, 9, 10, 11, or 12 standard, or the institute of electronic and electrical engineers (IEEE) 802.16p, 802.16n, 802.16m-2011, 802.16h-2010, 802.16j-2009, or 802.16-2009 standard, also referred to as WiMAX.

In another embodiment, the communications network can be a wireless local area network (such as a wireless fidelity network (Wi-Fi)) that can be configured to operate using a standard such as the IEEE 802.11-2012, IEEE 802.11ac, or IEEE 802.11ad standard. In another embodiment, the communications network can be configured to operate using a Bluetooth standard such as Bluetooth v1.0, Bluetooth v2.0, Bluetooth v3.0, or Bluetooth v4.0. In another embodiment, the communications network can be configured to operate using a ZigBee standard, such as the IEEE 802.15.4-2003 (ZigBee 2003), IEEE 802.15.4-2006 (ZigBee 2006), or IEEE 802.15.4-2007 (ZigBee Pro) standard.

A multiple-input and multiple-output (MIMO) system includes one or more transmitters, each with multiple antennas, and one or more receivers, each with one or more antennas. The multiple antennas at the one or more transmitters and the one or more antennas at the one or more receivers can be used to improve communication performance of a system by increasing a data throughput, a link range, and a link strength of the communications system without additional frequency bandwidth or increased transmit power. The MIMO system can increase the data throughput, the link range, and the link strength by spreading transmit power typically used for a single antenna over the multiple antennas in the antenna array to achieve an array gain that improves the spectral efficiency (e.g. more bits per second per hertz of bandwidth) and/or to achieve a diversity gain that improves the link reliability (e.g. reduce fading).

In a two dimensional (2D) MIMO system, beamforming can be performed in a horizontal domain. A 2D MIMO system in a communication system can include a plurality of cell sites, each having a node such as an evolved Node B (eNode B) or base station, for sending and receiving signals over one or more antennas or antenna modules. In one embodiment, each antenna module can have one or more receiving antennas and one or more transmit antennas. In another embodiment, each antenna module can have one antenna to transmit and receive data.

FIG. 1A depicts a 1D antenna array 102a in a 2D MIMO system 100a. FIG. 1A further depicts a plurality of antenna elements 104a in the 1D antenna array 102a. FIG. 1A also shows two arrows emanating from the array 102a in the left and right directions. In one embodiment, the antenna array 102a can be used for spatial multiplexing in the horizontal dimension. Each of the antenna elements can correspond to an antenna port. For example, FIG. 1A shows eight antenna elements 104 that each correspond to an antenna port in the antenna array 102a. The two arrows to the right and left depict the horizontal directionality of the 1D antenna array 102a that the antenna elements 104a can be adjust to change the coverage area of the communications network.

The antenna array 102a can be mounted on a transmission point 106a, such as an eNode B, with a corresponding coverage area 108a. The horizontal directivity provided by the array is depicted by the beam direction geometries, 110a, 112a, and 114a. A beam direction geometry, also referred to as a radiation pattern, can depict a region with respect to a transmission point where a corresponding signal is highest, but the corresponding signal may be present in other regions as well. The curved arrow indicates that the three different beam direction geometries, or side lobes, that belong to a continuum of different possibilities.

FIG. 1B depicts a two dimensional (2D) antenna array 102b in a three dimensional (3D) or full dimensional (FD) MIMO system 100b. FIG. 1B further depicts a plurality of antenna elements 104b in the 2D antenna array 102b. The 2D array comprises antenna columns 116 in the 2D antenna array 102b. FIG. 1B also shows three arrows emanating from the antenna array 102b in different directions, two dashed arrows pointing upward and downward and the solid arrow normal to the plane of the array, depict the directionality of the antenna array 102b in the vertical dimension. The array can be mounted on a transmission point 106b, such as an eNode B, with a corresponding coverage area 108b. The vertical directivity provided by the antenna array 102b is depicted by two different beam direction geometries, a first beam direction geometry 118 and a second beam direction geometry 120. As discussed in the preceding paragraphs, a beam direction geometry can depict a region with respect to the transmission point where a corresponding signal is highest, but the corresponding signal can be present in other regions as well. The curved arrow indicates that the three different beam direction geometries or side lobes that belong to a continuum of different possibilities.

3D or FD MIMO systems can be used in MIMO networks to enhance the cellular performance by deploying antenna elements in both horizontal and vertical dimensions, e.g. a 2D antenna array. A FD MIMO system can direct communications in two dimensions, i.e. horizontally and vertically, to a location in 3D space. The direction of communications in 3D space can increase the directionality, allowing for increased numbers of communication paths, more focused beamforming, and increased throughput for spatial multiplexing in relative to 2D MIMO systems.

FIG. 1B further depicts the antenna elements 104b of the antenna array 102b providing for vertical directionality. Additionally, the antenna elements 104b of the antenna array 102b can also provide for horizontal directionality, as discussed in the preceding paragraphs related to FIG. 1A. Therefore, the communications can be directed in two dimensions to point toward a location in 3D space.

In the 3D MIMO system, a radiation pattern of a transmitting antenna at a node can be tilted along a vertical axis. The degree of the vertical tilting or the tilting angle can be measured relative to a horizontal plain of reference. The tilting angle can be referred to as the downtilt angle of the antenna. The downtilt angle of the antenna can be measured to be positive from the horizontal reference plain of the antenna towards the ground. For example, an antenna with a downtilt angle of 10 degrees tilts towards the ground at a 10 degree angle relative to the horizontal reference.

In one embodiment, phases and/or amplitudes of the antenna elements 104b in the antenna array 102b can be configured to enable the antenna array 102b to transmit to a desired coverage area, which is a geographic area in which a mobile terminal can receive a signal with a sufficient strength to communicate with a node associated with the antenna array. A coverage area range and/or scope of an antenna array can be affected by the electronic downtilt angle of each antenna and/or downtilt angles of surrounding and/or adjacent antennas in the antenna array 102b.

In a single-user multiple-input single output (SU-MISO) transmission scheme or a single-user MIMO (SU-MIMO) transmission scheme, all communication streams or layers from antennas of a transmitter can be assigned to a single UE for a selected period of time. In one embodiment, a SU-MISO or a SU-MIMO can be used to increase a peak data rate of the MIMO for a UE. In one example of a SU-MISO or a SU-MIMO, data can be transmitting on several layers, e.g. on several bit streams, and the information can be spread over a spatial domain to increase a data rate of the MIMO or the MISO for the UE. In one configuration, the base station of the SU-MISO system or the SU-MIMO system can be a 3D MIMO or a FD MIMO.

FIG. 2A illustrates a SU-MISO configuration. The SU-MISO configuration shows a base station 210 (such as an eNode B) with a plurality of transmit antennas 230 transmitting in a SU-MISO mode to a single UE 220 with a single of receiver antenna 250. FIG. 2A further illustrates several layers 240 for communicating data between the base station 210 and the UE 220.

Figure 2B:
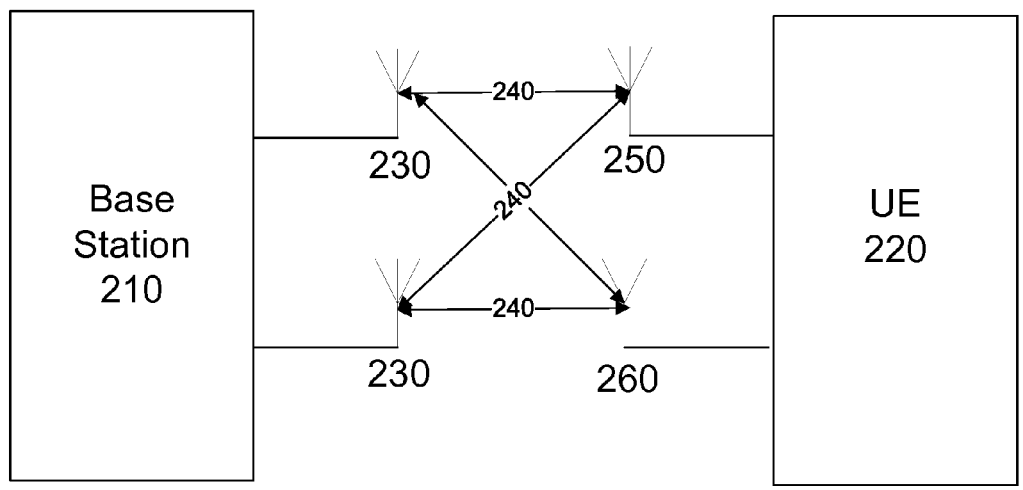
FIG. 2B illustrates a single-user multiple-input multiple-output (SU-MIMO) configuration in accordance with an example.

FIG. 2B illustrates a SU-MIMO configuration. The SU-MIMO configuration shows a base station 210 (such as an eNode B) with a plurality of transmit antennas 230 transmitting in a SU-MIMO mode to a single UE 220 with a plurality of receiver antennas 250 and 260. FIG. 2B further illustrates several layers 240 for communicating data between the base station 210 and the UE 220. In one embodiment, the SU-MIMO configuration can be used when the base station 210 has buffered a threshold amount of data traffic to be transmitted to the UE 220 and the several layers 240 can provide a threshold channel quality level. One advantage of an SU-MIMO configuration for a communications network is to provide higher gains in a relatively less dispersive channel environment.

Figure 2C:
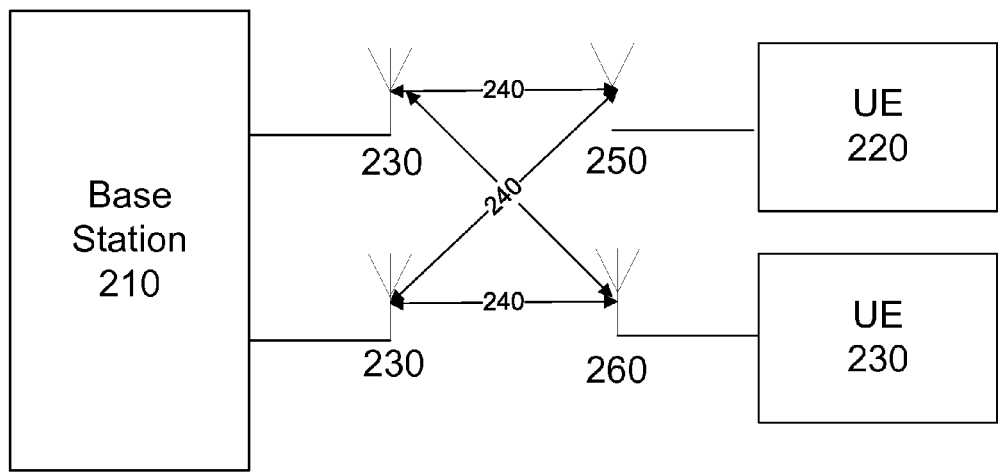
FIG. 2C illustrates a multi-user MIMO (MU-MIMO) configuration in accordance with an example.

FIG. 2C illustrates a multi-user MIMO (MU-MIMO) configuration. The MU-MIMO configuration shows a base station 210 (such as an eNode B) with a plurality of transmit antennas 230 transmitting in a MU-MIMO mode to a UE 220 with a receiver antenna 250 and a UE 230 with a receiver antenna 260. FIG. 2C further illustrates several layers 240 for communicating data between the base station 210 and the UEs 220 and 230.

Figure 2D:
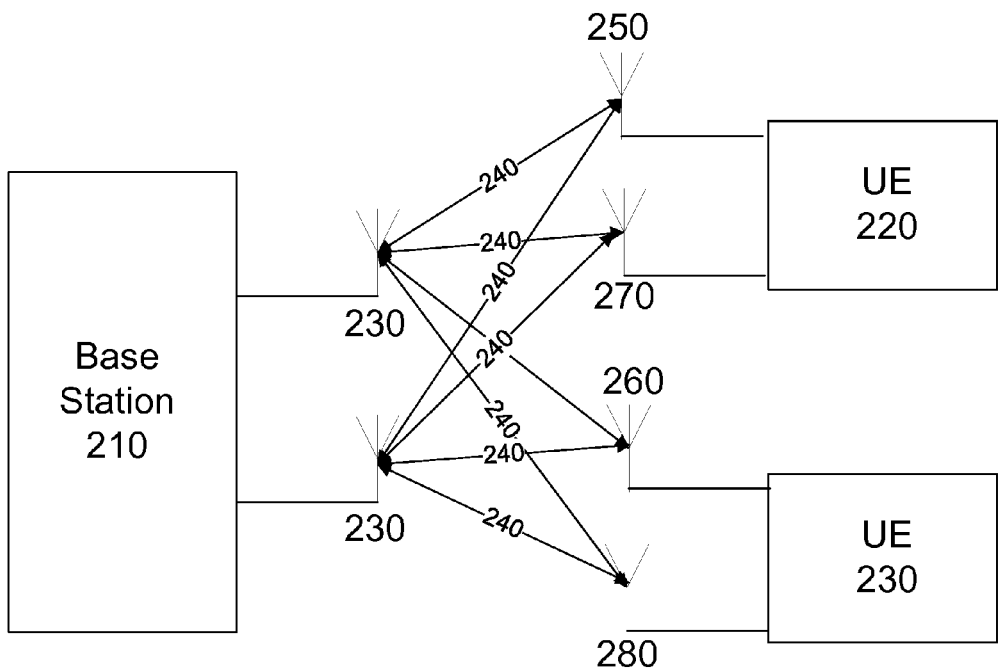
FIG. 2D illustrates another multi-user MIMO (MU-MIMO) configuration in accordance with an example.

FIG. 2D illustrates another multi-user MIMO (MU-MIMO) configuration. FIG. 2D illustrates a MU-MIMO configuration including a base station 210 (such as an eNode B) with a plurality of transmit antennas 230 transmitting in a MU-MIMO mode to a UE 220 with a plurality of receiver antennas 250 and 270 and a UE 230 with a plurality of receiver antennas 260 and 280. FIG. 2D further illustrates several layers 240 for communicating data between the base station 210 and the UEs 220 and 230.

In a MU-MIMO transmission scheme, several UEs can be assigned a same resource block(s) one or more streams or layers at a same time. Traditionally, a number of layers or streams used simultaneously for communicating data are based on properties of the MIMO channel. In one example, when temporal fading or radio frequency (RF) fading occurs, the traditionally MIMO channel does not support more than one layer transmission to a single UE. In one embodiment, temporal fading or radio frequency (RF) fading can be caused by constructive and destructive interference of RF due to multipath propagation and/or a movement of objects in the environment.

In MIMO systems, spatial multiplexing is used to increase the capacity of a single frequency channel. Data is transmitted from two or more antennas simultaneously, and the data on each antenna is different. In one example, when MIMO system can include three transmit (Tx) antennas and three receive (Rx) antennas, a spectral efficiency (i.e. capacity) of an communications channel may be increased 3 times. In one embodiment, performance of a MIMO system can depend on a signal received at each of the three receiving antennas from each of the three transmitting antennas. In one embodiment, the paths from each transmitting antenna to each receiving antenna can uncorrelated while having a threshold signal to noise ratio (SNR) to enable reliable demultiplexing at the receiver. In another embodiment, when a signal at one or more of the three antennas at the receiver is below a selected signal to noise ratio (SNR), the receiver may be unable to support a desired data rate for the MIMO system.

Traditionally, accurate channel estimation and correct UE pairing with limited reference signal (RS) ports can be difficult when transmitting data to a plurality of UEs on the same frequency. In one embodiment, a spatial domain or layers can be used to separate transmissions on the same physical resource to a plurality of UEs, e.g. layers belonging to different UEs can transmitted on the same physical resource. In another embodiment, angles of arrival (AoAs) and angles of departure (AoDs), beamforming, and uplink (UL) and downlink (DL) correspondence can be used for channel estimation and UE pairing for RS ports in a MU-MIMO system. In one example, uplink (UL) and downlink (DL) correspondence can be used for spatial domain frequency-division duplexing (FDD).

Figure 3:
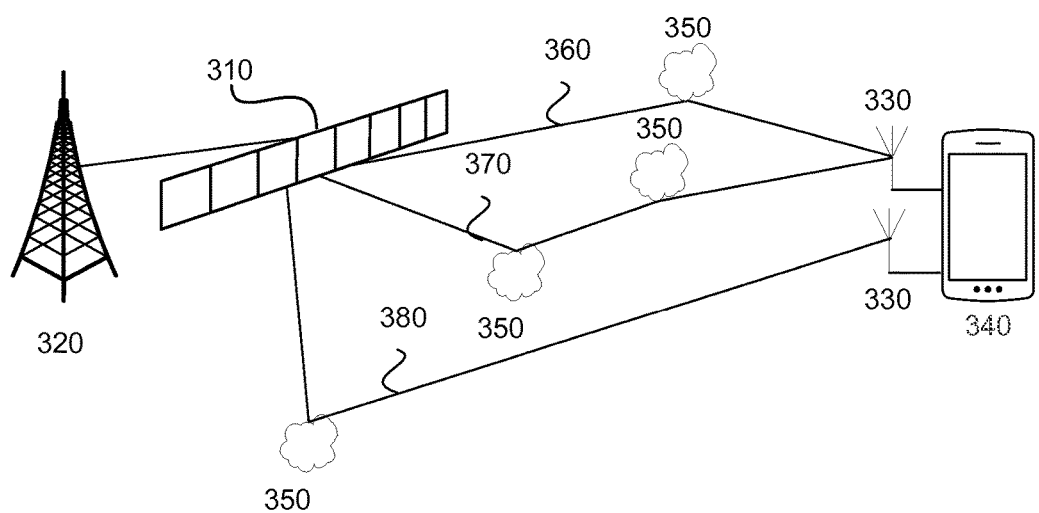
FIG. 3 illustrates data communicated between a plurality of antennas of an evolved Node B (eNode B) and a plurality of antennas of a user equipment (UE) in a MIMO system in accordance with an example.

FIG. 3 shows data communicated between a plurality of antennas 310 of an eNode B 320 and a plurality of antennas 330 of a UE 340 in a MIMO system. FIG. 3 further shows that propagation waves, such as electromagnetic waves, used to communicate data between the eNode B 320 and the UE 340 can get bounced and reflected off of one or more objects 350 during the communication. When the electromagnetic waves get bounced and reflected off of the one or more objects 350, the electromagnetic waves can take different paths 360, 370, and 380 between the eNode B 310 and the UE 340. In one example, the different paths 360, 370, and 380 can have different path lengths and/or different AoAs at the eNode B 310 or the UE 340. In another example, the different path lengths and/or the different AoAs can cause different levels of received power and/or phase levels of data signals at a receiving antenna of the eNode B 320 or the UE 340. In another example, the paths 360, 370, and/or 380 can include a plurality of sub-paths. In one embodiment, sub-paths can be paths with substantially similar directions and minor variations in power and/or phases of the paths that the data signals travels. In one example, paths 360, 370, and 380 can each include 20 sub-paths.

In one configuration, when a transmission reverses directions, e.g. when the eNode B 320 transmits data to the UE 340, the electromagnetic waves can propagate along substantially the same set of paths 360, 370, and 380 as when the UE 340 transmits data to the eNode B 320. In one embodiment, signal phases on a particular subpath may not correlate with the transmission directions, e.g. between a downlink (DL) transmission direction and an uplink (UL) transmission direction. In one example, signal phases on a particular subpath may not correlate due to transmitter antennas and receiver antennas being driven by different circuit chains causing different phases to be imposed on top of the signals. In one example of an (FDD) scheme, a UL phase and a DL phase on each subpath can be independent of each other.

For an UL antenna array with M antennas, a vector for a spatial channel can have the following format:

$$A := A_1\beta_1 + \ldots + A_N\beta_N, \qquad (1)$$

where N is a path number of a selected path for a data transmission, $A_N\beta_N$ is a signal strength of a data transmission on the selected path N, $A_N$ is a signal strength of a transmission communicated on path N, and $\beta_N$ is a spacial signature or spacial direction of a transmission communicated on path N. In one configuration, $\beta_N$ can be determined using:

$$\beta_n = \left[1, e^{-j2\pi\Delta\frac{f_{UL}}{F_0}\cos\alpha_n}, \ldots, e^{-j2\pi(M-1)\Delta\frac{f_{UL}}{F_0}\cos\alpha_n}\right]^T, \qquad (2)$$

where $\beta$ is a spatial signature of an n-th path, $F_0$ is a carrier frequency, $f_{UL}$ is an actual UL frequency, $\Delta$ is an antenna spacing of a carrier wavelength, $\alpha_n$ is an AoA of the n-th path, T is a selected time period, and the remaining variable are the same as discussed for equation (1).

In one configuration, UL sounding can be used to estimate an AoA of a major path of a propagation wave used for data transmission. In one example, a BS, such as an eNode B, can send a sounding signal schedule to one or more UEs indicating when the one or more UEs can send sounding signals to the BS. In another example, one or more UEs can send sounding signals to the base station. In another example, the base station can determine one or more major paths of data transmissions from the one or more UEs using the sounding signals. In another configuration, the eNode B can determine an AoA that corresponds to a selected major path using an antenna array of the eNode B.

In one embodiment, for each UE, the eNode B can determine one or more major paths of a data transmission for each UE using a sounding sequence. In one example, each major path (k) can be estimated as [(u, k)−e, (u, k)+e], where u is a UE index, (u, k) is a center direction of an AoA for the major path k, and e is the span of the angle. In another embodiment, when UE includes a plurality of antennas, the eNode B can schedule the UE to send the sounding signal using one of the antennas or using a selected number of the antennas of the UE. One advantage of the UE sending the sounding signal using a plurality of antennas is to increase a diversity and reliability of the sounding signal.

In one configuration, when the eNode B receives a signal vector A (as in equation 1), the eNode B can project the signal vector A towards all spatial signatures defined as $$[1, e^{-j2\pi \Delta_{UL} \cos\theta}, \ldots , e^{-j2\pi(M-1)\Delta_{UL} \cos\theta}]^T / \sqrt{M} \quad (3)$$

for $$\theta \in [0, \theta_{max}], \quad (4)$$

where $\Delta_{UL}$ is an antenna spacing for a UL wave length, $\theta_{max}$ is a maximum angular span of an antenna array, and the remaining variable are the same as discussed for equation (1). In one embodiment, AoAs of the major K paths can be determined using peak values of equation (3) over an angular span. In another embodiment, the AoAs of the major K paths can be defined as $$A\_est(u) := \{A(u,1), k=1, \ldots, k\}, \quad (5)$$

where the variables are the same as discussed in the preceding paragraphs.

Figure 4:
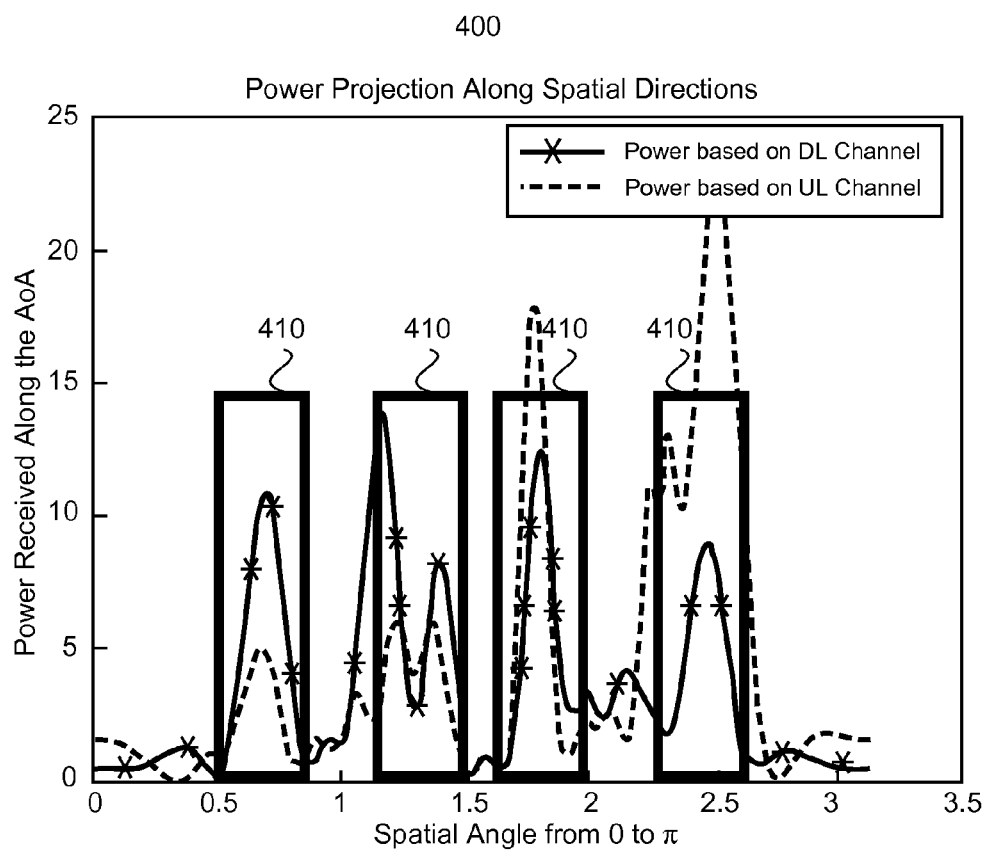
FIG. 4 shows a graph of received power along spatial directions for a UE in accordance with an example.

FIG. 4 shows a graph 400 of received power along spatial directions for configuration. In one embodiment, a duplex gap can be 100 megahertz (MHz) at 2.5 gigahertz (GHz). In another embodiment, the rectangles 410 along the spatial angle axis can be major AoAs. FIG. 4 further illustrates a correlation between UL AoAs and DL AoDs for a UE. In one embodiment, a major path can be a path that contains a threshold amount of power received on a DL channel or a UL channel at a base station or a UE.

FIG. 5 shows a table 500 of AoAs of major paths of selected UEs. In one embodiment, an eNode B can determine the AoAs of major paths of the selected UEs using sounding signals. In another embodiment, when the eNode B determines the AoAs of the major paths of the selected UEs, the eNode B can generate a table 500 of the AoAs of the major paths of the selected UEs. In another embodiment, the eNode B can rank the peaks of power received along the AoAs from each selected UE, as shown in FIG. 4, according to a level of power received for each selected UE relative to the other selected UEs. In one configuration, the selected UEs can have different numbers of AoA. For example, UE 1 can have 4 major paths at AoA 1, AoA 2, AoA 3, and AoA 4 and UE(U) can have 2 major paths at AoA 1 and AoA 2.

In one embodiment, the eNode B can determine candidate pairs for MU-MIMO transmissions. In one example, a candidate pair can be selected from antennas of a UE and paired with selected antennas of the eNode B. In another example, the candidate pairs can include UEs in a MU-MIMO group with a spatial domain separation that exceeds a selected threshold (i.e. non-overlapping channels). In another embodiment, the eNode B can build one or more candidate MU-MIMO sets for the UEs in a cell of the eNode B using spatial projections and/or the table 500. In one example, the one or more candidate MU-MIMO sets can include only UEs with non-spatially overlapping channels. In another example, a channel overlap can be a selected size of an intersection of AoAs on major paths of UEs.

Figure 6:
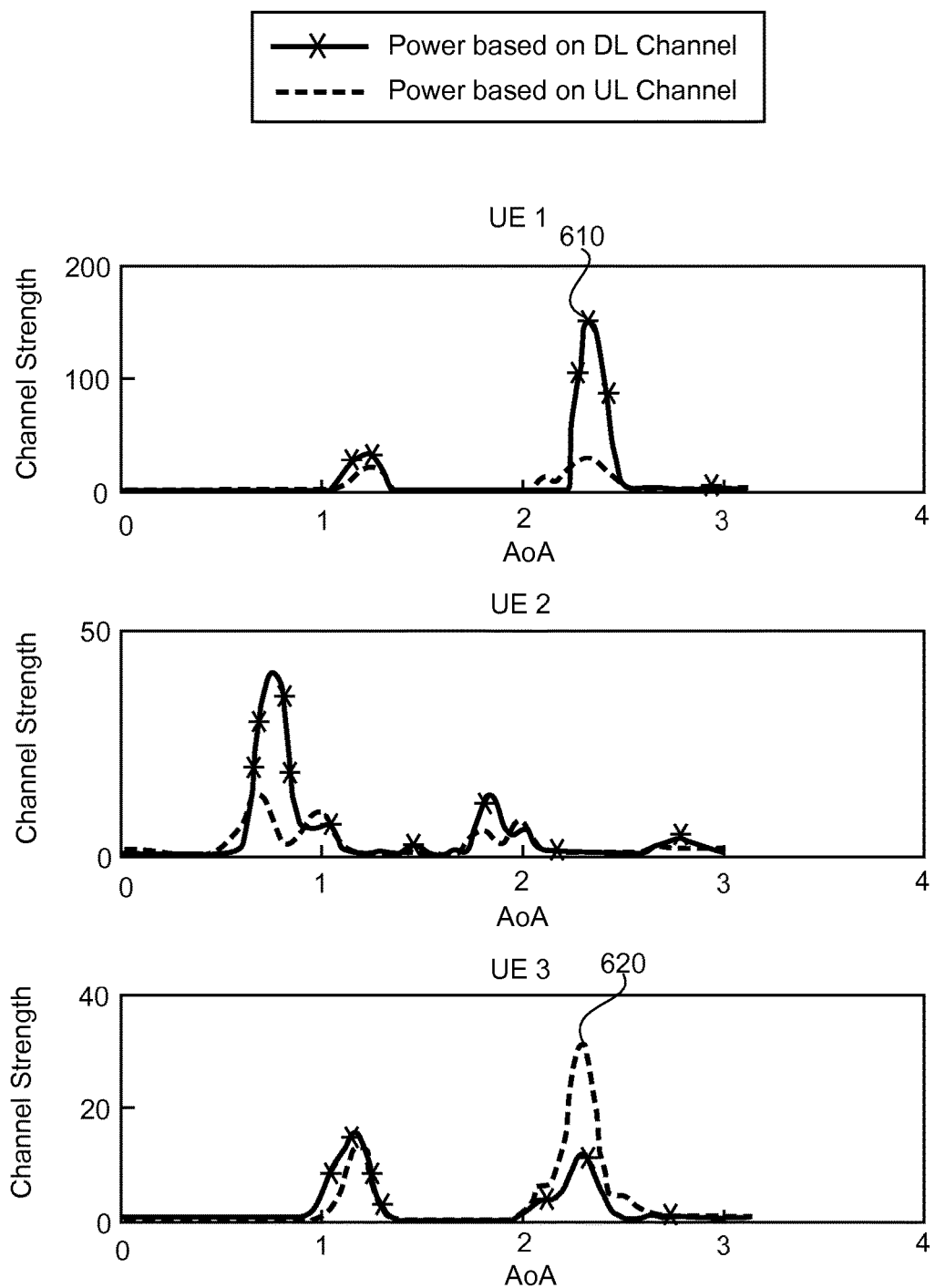
FIG. 6 depicts sector level sweep (SLS) channel traces showing MU-MIMO candidate pairing in accordance with an example.

FIG. 6 depicts sector level sweep (SLS) channel traces showing MU-MIMO candidate pairing. FIG. 6 further shows an x-axis as an AoA between 0 and $\pi$ and a y-axis as a relative channel strength of UL channels and/or DL channels. In one example, UE 2 can be paired with either UE 1 or UE 3. In another example, UE 1 cannot be with UE 3 due to UE 1 having an overlapping AoA 610 with an AoA 620 of UE 3. In one embodiment, the eNode B can determine an overlap in AoAs between UEs, such as the AoA 610 of UE 1 overlapping with the AoA 620 of UE 3, when the channel strength exceeds a selected threshold at substantially similar AoAs for two or more of the UEs.

Figure 7:
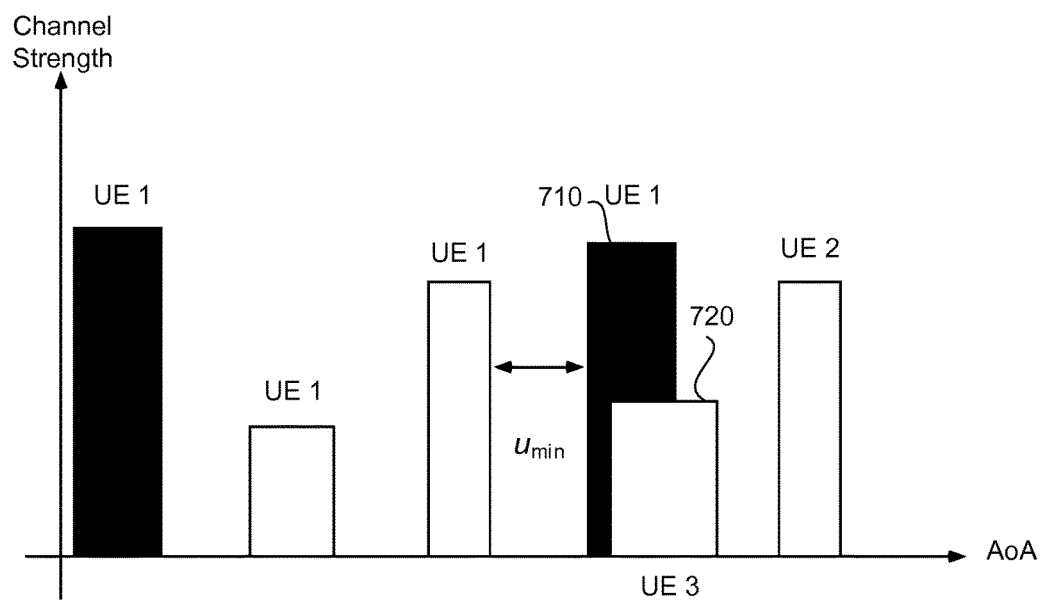
FIG. 7 illustrates a graph of AoAs for a plurality of UEs in accordance with an example.

FIG. 7 illustrates a graph of AoAs for a plurality of UEs, i.e. UE 1, UE 2, and UE 3. FIG. 7 further illustrates channel strengths for each of the AoAs for UE 1, UE 2, and UE 3. In one configuration, the eNode B can group selected UEs into candidate MU-MIMO sets using different schemes. One scheme for the eNode B grouping selected candidate UEs into candidate MU-MIMO sets can be a minimum angular separation scheme. In one embodiment, the minimum angular separation scheme can include the eNode B defining a candidate MU-MIMO set, such as UE(u). In one example, UEs in a cell of the eNode B can initially be in a selected set, such as set-B. In this example, the eNode B can determine when a candidate UE in set-B can be moved to the candidate MU-MIMO set based on selected criteria. In one embodiment, the selected criteria can include: 1) no AoAs on any major paths of the candidate UE are within a threshold angular distance $\mu_{min}$ of other candidate UEs of the MU-MIMO set and 2) a total number of AoAs on the major paths of the candidate UE is the highest among the UEs that are not-selected and that satisfy criteria 1). In one embodiment when there are more than one candidate UEs that satisfy criteria 1) and 2), a UE candidate with a higher signal to interference plus noise ratio (SINR) relative to the other candidate UEs can be added to the candidate MU-MIMO set.

In one embodiment, the eNode B can iteratively evaluate UEs in set-B to determine the UEs in set-B that satisfy the selected criteria and add the UEs in set-B that satisfy the selected criteria to a selected candidate MU-MIMO set. In one example, the eNode B can iteratively add the UEs in set-B that satisfy the selected criteria until a threshold number of UEs has been added to the candidate MU-MIMO set or the set-B does not include any more UEs in set-B that satisfy the selected criteria. In another embodiment, when the set-B only includes UEs that do not satisfy the selected criteria, the eNode B can create unique candidate MU-MIMO sets for one or more of the remaining UEs in set-B, such as unique candidate MU-MIMO sets for each of the remaining UEs in set-B.

Returning to FIG. 7, under the minimum angular separation scheme, the eNode B can determine that UE 1 satisfies the selected criteria of the minimum angular separation scheme and move UE 1 from set-B to the selected candidate MU-MIMO set. In another example, the eNode B can then determine that UE 2 satisfies the selected criteria of the minimum angular separation scheme and move UE 2 from set-B to the selected candidate MU-MIMO set. In another example, eNode B can then determine that UE 3 does not satisfy the selected criteria of the minimum angular separation scheme, e.g. UE 3 does not satisfy selected criteria 1) as a major path of UE 3 of set-B is within the threshold angular distance $\mu_{min}$ of UE 1 of the candidate MU-MIMO set. In this example, the candidate MU-MIMO set would be candidate MU-MIMO set={UE 1, UE 2}.

In one embodiment, the eNode B can analyze the UEs of set-B in a selected sequence or predetermined sequence to determine when the UEs can be added to the candidate MU-MIMO set. In another embodiment, the eNode B can analyze the UEs of set-B in a random order to determine when the UEs can be added to the candidate MU-MIMO set.

Another scheme for the eNode B grouping selected candidate UEs into candidate MU-MIMO sets can be an exhaustive pairing scheme. In one embodiment, the exhaustive pairing scheme can include the eNode B defining a candidate MU-MIMO set, such as UE(u). In one embodiment, UEs in a cell of the eNode B can initially be in a selected set, such as set-B. In another embodiment, the eNode B can determine when a candidate UE in set-B can be moved to the UE(u) set based on selected criteria. In one embodiment, the selected criteria can include: 1) the UE has at least one AoA on a major path of the UE that is not overlapped by any other UE in the UE(u) set, and 2) a total number of overlapping AoAs of UEs in the UE(u) set does not exceed a threshold value. In one configuration, the overlapping signals at selected AoAs or major paths of the UEs in the UE(u) set can be nulled or filtered out of communication between the eNode B and the UEs in the UE(u) set. In another configuration, when a plurality of UEs overlap at the same AoA, the AoA can be counted once for the total number of overlapping AoAs of UEs in the UE(u) set.

Returning to FIG. 7, under the exhaustive pairing scheme, the eNode B can determine that UE 1 satisfies the selected criteria of the exhaustive pairing scheme and move UE 1 from set-B to the UE(u) set. The eNode B can then determine that UE 2 satisfies the selected criteria of the minimum angular separation scheme and move UE 2 from set-B to the UE(u) set. The eNode B can then determine that UE 3 satisfies the selected criteria of the minimum angular separation scheme and move UE 3 from set-B to the UE(u) set. In this example, the threshold value for the total number of overlapping AoAs of UEs in the UE(u) set is a number that exceeds one overlapping AoA. Accordingly, although an AoA 710 of UE 1 and an AoA 720 of UE 3 have overlapping AoAs on a major path, where the number of overlapping AoAs on a major path is below the threshold value, both UE 1 and UE 3 can be added to the UE(u) set (e.g. the UE(u)={UE 1, UE 2, UE 3}. Additionally in this example, the eNode B can null or filter out the overlapping AoAs 710 and 720 on the major paths of UE 1 and UE 3.

In one configuration, when the eNode B has assembled a candidate MU-MIMO set, the eNode B can refine the candidate MU-MIMO set using a channel quality indicator (CQI) report from the UEs in the candidate MU-MIMO set. In one embodiment, the eNode B can rank the candidate UEs and/or candidate MU-MIMO sets using one or more ranking metrics. In one embodiment, the ranking metrics can include: a waiting time metric, a proportional fair metric, a predetermined ranking sequence, or a bandwidth rate of a UE or a candidate MU-MIMO set. In one example, the waiting time metric can be: a waiting time from a previous data transmission between a base station and a UE; a waiting time for data transmissions between a base station and a UE; and/or waiting time of packets in a queue for data transmission. In one embodiment, one or more UEs can have one or more packets waiting in a queue.

In one example, the eNode B can rank the candidate UEs and/or candidate MU-MIMO sets using a UE-centric ranking. In one embodiment of UE-centric ranking, the eNode B can choose a selected number of UEs, such as J UEs, with higher ranking metrics relative to other candidate UEs. In another embodiment, the eNode B can determine a candidate UE of a candidate MU-MIMO set with a highest ranking metric relative to the candidate UEs in other candidate MU-MIMO sets.

In one example, the eNode B can rank the candidate UEs and/or candidate MU-MIMO sets using cell-centric ranking. In this example for cell-centric ranking, the eNode B can choose a selected number of candidate MU-MIMO sets or a selected number of candidate UEs with a highest sum of ranking metrics relative to other candidate MU-MIMO sets or candidate UEs. In one embodiment, the selected number of candidate MU-MIMO sets or a selected number of candidate UEs can be one candidate MU-MIMO set or one candidate UE.

In one configuration, the eNode B can send probing signals, such as channel state information reference symbols (CSI-RSs), along one or more major paths to selected candidate MU-MIMO sets or to a selected number of candidate UEs. In one example, based on a number of resources of the eNode B for RS, the eNode B can select a chosen number of candidate MU-MIMO sets or a selected number of candidate UEs for CQI feedback, e.g. J CQI feedbacks.

In one embodiment, a probing signal can include a request that each chosen candidate MU-MIMO set or the candidate UEs feedback a CQI and/or a precoding matrix indicator (PMI) to the eNode B. In another embodiment, the eNode B can generate a unique or specific CSI-RS for each of the chosen candidate MU-MIMO sets or a selected number of candidate UEs. In another embodiment, the eNode B can include CSI-RS ports and each CSI-RS port can beam a data transmission on an AoA of a major path of a candidate MU-MIMO set or on AoAs of each major paths of the candidate UEs. In one example, when there is extra or undesignated CSI-RS ports, two or more CSI-RS ports can be clustered together for to increase differentiation of different AoAs or different major paths.

Figure 8:
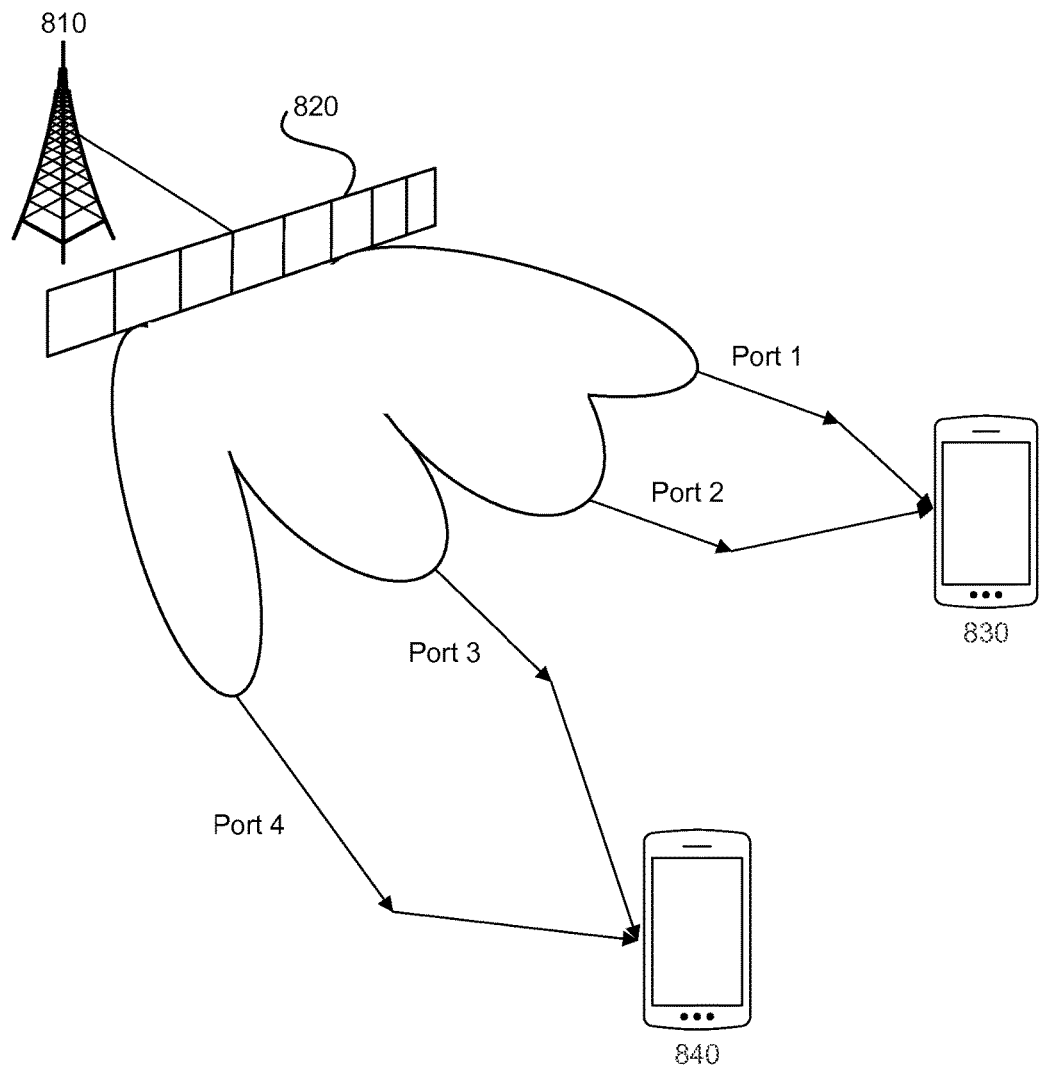
FIG. 8 illustrates a plurality of antennas of an eNode B with CSI-RS ports for probing major paths or channels of UEs in accordance with an example.

FIG. 8 illustrates a plurality of antennas 820 of an eNode B 810 with CSI-RS ports 1-4 for probing major paths or channels of UEs 830 and 840. FIG. 8 further illustrates that CSI-RS port 1 and port 2 can be clustered together for communication with UE 830 and CSI-RS port 3 and port 4 can be clustered together for communication with UE 840. While the example illustrates the use of CSI-RS ports, it should be noted that this is not intended to be limiting. Any type of reference signal port can be used.

In one embodiment, the eNode B can send a DL reference signal to a selected candidate MU-MIMO set. In one example, a candidate MU-MIMO set can include a selected number of non-overlapping AoAs (e.g. K non-overlapping AoAs), as in the minimum angular separation scheme or the exhaustive pairing scheme discussed in the preceding paragraphs. In another example, the eNode B can generate K beamforming vectors, such as one beamforming vector for each AoA, using channel quality information of each UE. One advantage of the eNode B generating beamforming vectors or pre-coding vectors is to increase an accuracy in determining a spatial separation of major paths.

In one example, the eNode B can determine a data rate of a UE or a candidate MU-MIMO set using the channel quality information. In one embodiment, the eNode B can send out selected vectors (such as K vectors) to UEs in the candidate MU-MIMO set and the UEs can separately estimate channel quality information for the K vectors. In one example, the eNode B can send the K vectors for separate channel quality information estimation by the UEs using different antenna ports of the eNode B, time division multiplexing (TDM), frequency division multiplexing, or Code Division Multiplexing (CDM).

In one embodiment, each candidate UE in the candidate MU-MIMO set can monitor the K beamforming vectors and communicate channel quality information to the eNode B. In another embodiment, each candidate UE in the candidate MU-MIMO set can communicate the channel quality information using codebook-based feedback or beam-indexing feedback. In one configuration of the codebook-based feedback, the UE can select one or more channels for communication and determine channel quality information, including: precoders, ranks, and/or modulation and coding scheme (MCS) for the channels. In this configuration, the UE can communicate the determined channel quality information to the eNode B. In one configuration of the beam-indexing feedback, the UE can select one or more beams for communicating information and determine channel quality information including: received signal to interference plus noise ratio (SINR), a preferred rank, and/or MCS for the beams. In this configuration, the UE can communicate the determined channel quality information to the eNode B. In one embodiment, for a candidate MU-MIMO set selected using the exhaustive pairing scheme discussed in the preceding paragraphs, the eNode B can communicate beamformed reference signals that do not have overlapping angles. For example, the eNode B can avoid communicating beamformed reference signals on the overlapping angles of UE 1 and UE 3 as in FIG. 7.

In one embodiment, the eNode B can refine candidate UEs in the candidate MU-MIMO set based on channel quality of the candidate UEs. In another embodiment, the eNode B can refine candidate UEs in the candidate MU-MIMO set to increase an accuracy of pathloss, CQI, data rates, and/or MCS for a DL MU-MIMO transmission using the CSI-RS. One advantage of refining candidate UEs in the candidate MU-MIMO set using the CSI-RS can be to increase accuracy for pathloss, CQI, and/or MCS for UL paths and DL paths that have independent subpaths with different phases.

In another embodiment, there can be a linear combination for CSI-RS beamformed ports (such as the beamformed ports discussed in the preceding paragraphs). In one example when two beams B1 and B2 are designed for transmitting information in directions A1 and A2, then a linearly combined CSI-RS beamformed port 1 can transmit information in a a1*B1+b1*B2 direction and a linearly combined CSI-RS beamformed port 2 can transmit information in a a2*B1+b2*B2, where a1, b1, a2, and b2 and scalars. One advantage of linearly combining CSI-RS beamformed ports is to provide an increased matching for existing codebooks and better power distribution among antennas of an eNode B.

In one embodiment, the eNode B can refine the CQI for each of the candidate MU-MIMO sets using the CQI report. In one example, the eNode B can remove any UEs, in a candidate MU-MIMO set, with a SINR and/or a MCS below a threshold value. In another example, the eNode B can determine precoding directions of MU-MIMO transmissions for UEs remaining in each of the candidate MU-MIMO sets. In another example, the eNode B can update ranking metrics for the candidate MU-MIMO sets and/or the UEs remaining in the candidate MU-MIMO sets.

In one embodiment, the eNode B can select a candidate MU-MIMO set or a candidate UE for MU-MIMO transmission based on the refined candidate UEs and/or the refined candidate MU-MIMO sets. In another embodiment, the eNode B can schedule data transmissions, such as UL transmissions or DL transmissions, with the refined candidate MU-MIMO sets and/or precodings. In another embodiment, the eNode B can apply active nulling, during the data transmission schedule, to one or more major paths of the candidate MU-MIMO sets and/or the UEs remaining in the candidate MU-MIMO sets. In another embodiment, uniform linear arrays (ULA) or other antenna setups with a threshold AoA and/or AoD accuracy level can be used for the data transmissions.

Figure 9:
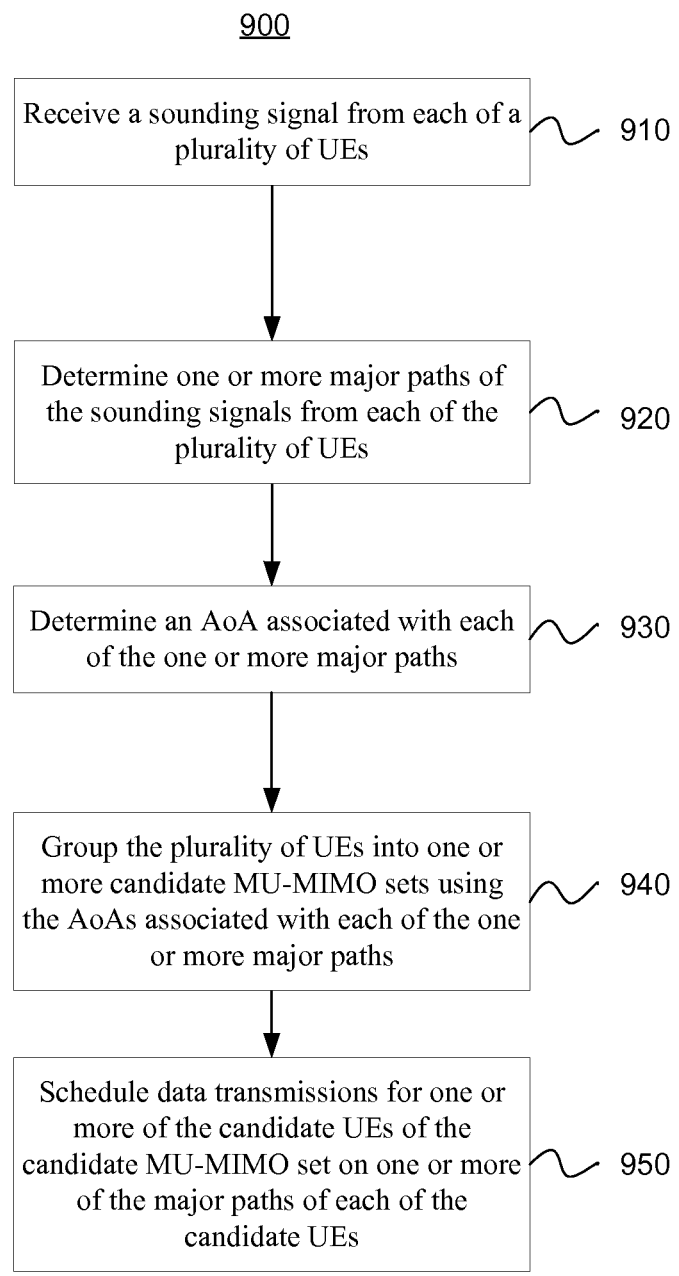
FIG. 9 depicts the functionality of circuitry of an eNode B operable to schedule data transfer for a MU-MIMO communications network in accordance with an example.

Another example provides functionality 900 of circuitry of an eNode B operable to schedule data transfer for a multiple user multiple-input and multiple-output (MU-MIMO) communications network, as shown in the flow chart in FIG. 9. The functionality may be implemented as a method or the functionality may be executed as instructions on a machine, where the instructions are included on at least one computer readable medium or one non-transitory machine readable storage medium. The circuitry can be configured to receive a sounding signal from each of a plurality of UEs, as in block 910. The circuitry can be further configured to determine one or more major paths of the sounding signals from each of the plurality of UEs, as in block 920. The circuitry can be further configured determine an AoA associated with each of the one or more major paths, as in block 930. The circuitry can be further configured to group the plurality of UEs into one or more candidate MU-MIMO sets using the AoAs associated with each of the one or more major paths, as in block 940. The circuitry can be further configured to schedule data transmissions for one or more of the candidate UEs of the candidate MU-MIMO set on one or more of the major paths of each of the candidate UEs, as in block 950.

In one embodiment, the circuitry can be further configured to send, to candidate UEs of one of the candidate MU-MIMO sets, a probing beam on the major paths of the candidate UEs and receive, from the candidate UEs of the candidate MU-MIMO set, channel quality information of each of the major paths to identify overlapping major paths of the candidate UEs. In another embodiment, the channel quality information includes a channel quality indication (CQI) report with signal to interference plus noise ratio (SINR) information or modulation and coding scheme (MCS) information. In another embodiment, the circuitry can be further configured to refine a CQI for the candidate MU-MIMO set of the candidate UEs based on the CQI report and remove UEs with an SINR or an MCS below a selected threshold from the candidate MU-MIMO set of the candidate UEs.

In one configuration, the circuitry can be further configured to determine precoding directions for each remaining candidate UEs in the candidate MU-MIMO set for MU-MIMO transmissions to the remaining selected UEs. In another configuration, the circuitry can be further configured to add a selected UE to a candidate MU-MIMO set based on selected criteria, wherein the selected criteria includes: each of the one or more AoAs for the major paths of the selected UE exceed a selected angular distance from the major paths of other UEs in the candidate MU-MIMO set; and a total number of the AoAs for major paths of the selected UE exceeds a number of the AoAs for major paths of each of the UEs with major angles that exceed the selected angular distance of the other UEs in the candidate MU-MIMO set.

In one example, the selected criteria further includes a signal to interference plus noise ratio (SINR) of the UE that exceeds a SINR of each of UEs with major angles that exceed a selected angular distance of other UEs in the candidate MU-MIMO set. In another example, the circuitry can be further configured to iteratively add a plurality of selected UEs to the candidate MU-MIMO set based on the selected criteria. In another example, the circuitry can be further configured to add a selected UE to a candidate MU-MIMO set based on selected criteria, wherein the selected criteria includes: at least one AoA for a major path of the selected UE does not overlap with any AoAs for major paths of other UEs in the candidate MU-MIMO set; and a total number of overlapping AoAs for the selected UEs of the candidate MU-MIMO set is less than a selected threshold number.

In one embodiment, the circuitry can be further configured to determine when at least one AoA for a major path of the selected UE overlaps with any AoAs for major paths of other UEs using: the AoA of the major paths of the selected UE and the other UEs; and relative channel strengths of the major paths of the selected UE and the other UEs. In another configuration, the circuitry can be further configured to: determine ranking criteria for each of a plurality of UEs or the one or more candidate MU-MIMO sets, wherein the ranking criteria includes: a waiting time, a proportional fair metric, a predetermined ranking sequence, or a bandwidth rate of a UE or a candidate MU-MIMO set; and select one or more UEs of the plurality of UEs or one or more of the candidate MU-MIMO sets with a highest individual ranking metrics or a highest sum of the ranking metrics.

In one configuration, the circuitry can be further configured to: form a unique probing beam for each of the selected one or more UEs of the plurality of UEs or the one or more of the candidate MU-MIMO sets, wherein the unique probing beam can be formed by: constructing beamforming vectors for each AoA of each major path of the selected one or more UEs of the plurality of UEs; constructing beamforming vectors for each AoA of each major path of UEs of one or more of the candidate MU-MIMO sets; communicate the beamforming vectors to the selected one or more UEs of the plurality of UEs or the one or more of the candidate MU-MIMO sets using: different antenna ports of the eNode B; time-division multiplexing (TDM); frequency-division multiplexing (FDM); or code-division multiplexing CDM; and receive channel quality information from the selected one or more UEs of the plurality of UEs or the one or more of the candidate MU-MIMO sets. In another embodiment, each beamforming vector of the selected one or more UEs of the plurality of UEs can be a unique major path for each of the selected one or more UEs or each beamforming vector of the UEs of one or more of the candidate MU-MIMO sets can be a unique major path for each of the UEs of one or more of the candidate MU-MIMO sets.

While examples have been provided discussing scheduling in a 3GPP LTE MU-MIMO communications network, this is not intended to be limiting. As previously discussed, embodiments disclosed herein can also be used for scheduling in other types of MU-MIMO communications networks, such as a WiMAX communications network, a High Speed Packet Access (HSPA) communications network, or any type of communications network that supports the use of sounding signals.

Figure 10:
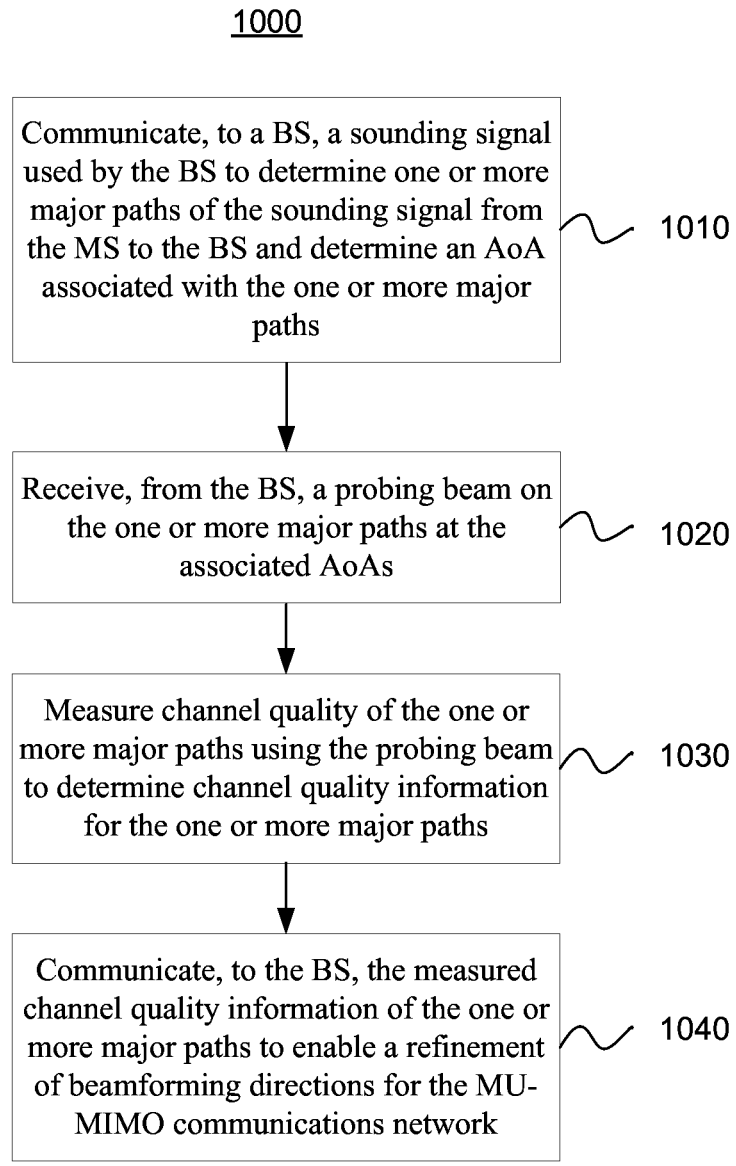
FIG. 10 depicts the functionality of circuitry of a UE operable to assist in scheduling data transfer for a MU-MIMO communications network in accordance with an example.

Another example provides functionality 1000 of circuitry of a mobile station (MS) operable to assist in scheduling data transfer for a multiple user multiple-input and multiple-output (MU-MIMO) communications network, as shown in the flow chart in FIG. 10. The functionality may be implemented as a method or the functionality may be executed as instructions on a machine, where the instructions are included on at least one computer readable medium or one non-transitory machine readable storage medium. The circuitry can be configured to communicate, to a Base Station (BS), a sounding signal used by the BS to determine one or more major paths of the sounding signal from the MS to the BS and determine an angle of arrival (AoA) associated with the one or more major paths, as in block 1010. The circuitry can be further configured to receive, from the BS, a probing beam on the one or more major paths at the associated AoAs, as in block 1020. The circuitry can be further configured to measure channel quality of the one or more major paths using the probing beam to determine channel quality information for the one or more major paths, as in block 1030. The circuitry can be further configured to communicate, to the BS, the measured channel quality information of the one or more major paths to enable a refinement of beamforming directions for the MU-MIMO communications network, as in block 1040.

In one embodiment, the probing beam can be a channel state information reference signal (CSI-RS) sent from the BS to the MS. In another embodiment, the channel quality information can include channel quality indication (CQI) information or precoding matrix indicator (PMI) information. In another embodiment, the circuitry can be further configured to receive data along the one or more major paths from the BS on a data transfer schedule, wherein the data transfer schedule can be based, at least in part, on the channel quality information and the major paths of the MS. In another embodiment, the circuitry can be further configured to calculate precoders, ranks, or modulation and coding scheme (MCS) for one or more feedback channels of the MS using the probing beam and communicate the precoders, the ranks, or the MCS on one or more feedback channels to the BS.

Figure 11:
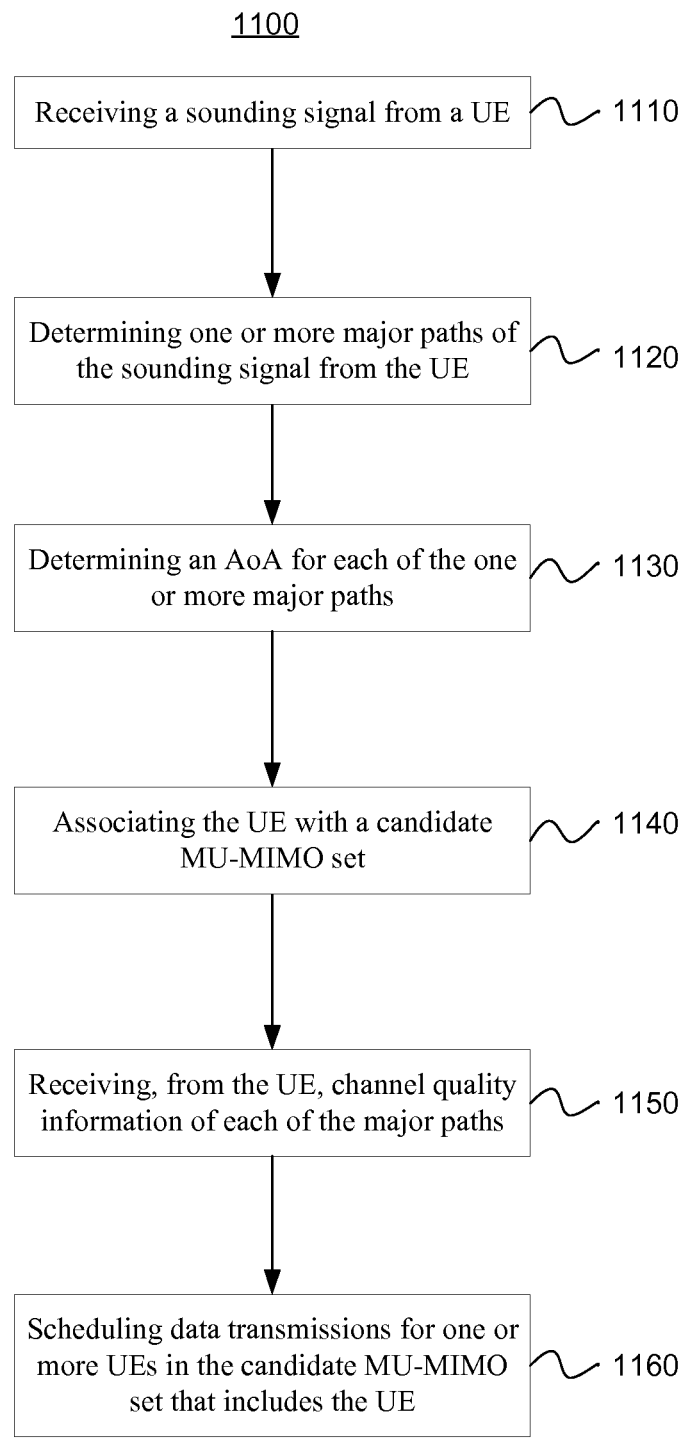
FIG. 11 depicts a product including a non-transitory storage medium having stored thereon instructions that are adapted to be executed to implement a method of scheduling data transfer for a MU-MIMO communications network in accordance with an example.

Another example provides functionality 1100 of a product including a non-transitory storage medium having stored thereon instructions that are adapted to be executed to implement a method of scheduling data transfer for a multiple user multiple-input and multiple-output (MU-MIMO) communications network, as in the flow chart in FIG. 11. The instructions of the product can be implemented as a method or as instructions on a machine, where the instructions are included on at least one computer readable medium or one non-transitory machine readable storage medium. The method can comprise receiving a sounding signal from a user equipment (UE), as in block 1110. The method can further comprise determining one or more major paths of the sounding signal from the UE, as in block 1120. The method can further comprise determining an angle of arrival (AoA) for each of the one or more major paths, as in block 1130. The method can further comprise associating the UE with a candidate MU-MIMO set, as in block 1140. The method can further comprise receiving, from the UE, channel quality information of each of the major paths, as in block 1150. The method can further comprise scheduling data transmissions for one or more UEs in the candidate MU-MIMO set that includes the UE, as in block 1160.

In one embodiment, the method can further comprise sending, to the UE, a probing beam on each of the major paths of the UE at each of the AoAs, wherein the UE uses the probing beam to determine the channel quality information. In another embodiment, the method can further comprise determining a precoding direction for a data transmission to the UE using the channel quality information. In another embodiment, the method can further comprise beamforming one or more probe channels of the eNode B using the channel quality information. In another embodiment, the method can further comprise linearly combining two or more probe channels. In another embodiment, the method can further comprise determining a data rate of a data transfer between the eNode B and the UE based on the channel quality information.

Figure 12:
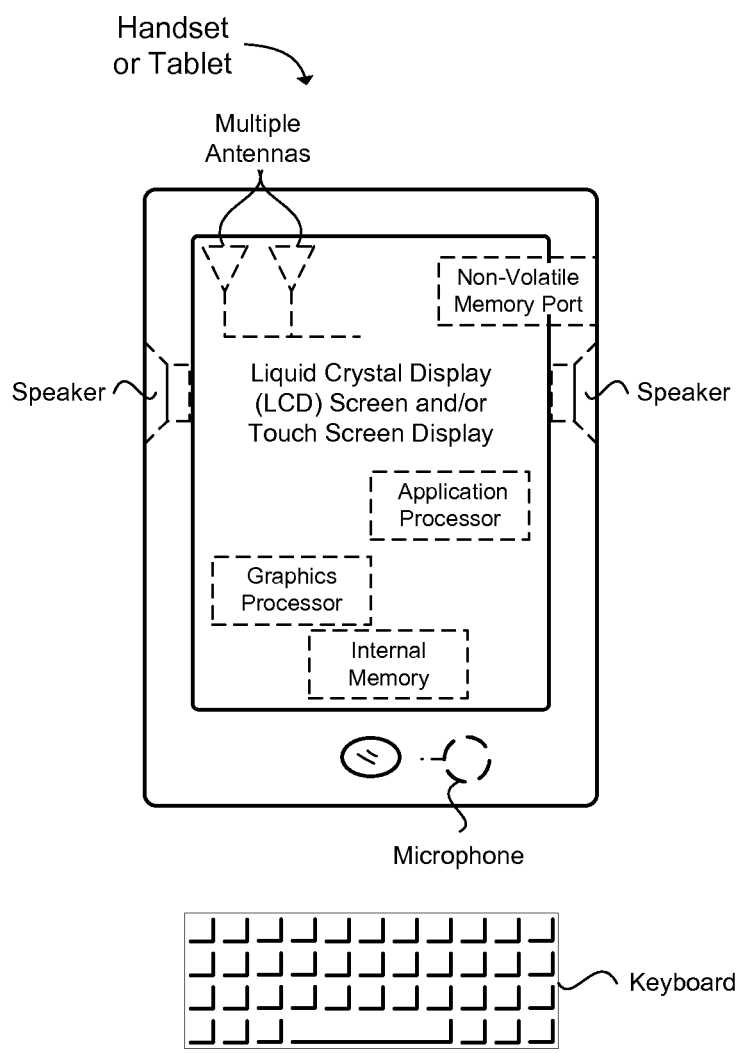
FIG. 12 illustrates a diagram of a UE in accordance with an example.

FIG. 12 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 12 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, or other medium for storing electronic data. The base station and mobile station can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that many of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An enhanced node B (eNode B) operable to schedule data transfer for a multiple user multiple-input and multiple-output (MU-MIMO) communications network, the eNode B having circuitry configured to:
receive a sounding signal from each of a plurality of user equipment (UEs);
determine one or more major paths of the sounding signals from each of the plurality of UEs;
determine an angle of arrival (AoA) associated with each of the one or more major paths;
group the plurality of UEs into one or more candidate MU-MIMO sets comprising candidate UEs, using the AoAs associated with each of the one or more major paths;
schedule data transmissions for one or more of the candidate UEs of the candidate MU-MIMO set on one or more of the major paths of each of the candidate UEs; and
send, to the one or more candidate UEs of one of the candidate MU-MIMO sets, a probing beam on the major paths of the candidate UEs, wherein the probing beam is used to measure a channel quality of the one or more major paths.

2. The circuitry of claim 1, further configured to:
receive, from the candidate UEs of the candidate MU-MIMO set, the channel quality information of each of the major paths to identify overlapping major paths of the candidate UEs.

3. The circuitry of claim 2, further configured to:
refine a CQI for the candidate MU-MIMO set of the candidate UEs based on the CQI report; and
remove UEs with an SINR or an MCS below a selected threshold from the candidate MU-MIMO set of the candidate UEs.

4. The circuitry of claim 3, further configured to determine precoding directions for each remaining candidate UEs in the candidate MU-MIMO set for MU-MIMO transmissions to the remaining candidate UEs.

5. The circuitry of claim 1, wherein the channel quality information includes a channel quality indication (CQI) report with signal to interference plus noise ratio (SINR) information or modulation and coding scheme (MCS) information.

6. The circuitry of claim 1, further configured to add a selected UE to a candidate MU-MIMO set based on selected criteria, wherein the selected criteria includes:
each of the one or more AoAs for the major paths of the selected UE exceed a selected angular distance from the major paths of other UEs in the candidate MU-MIMO set; and
a total number of the AoAs for major paths of the selected UE exceeds a number of the AoAs for major paths of each of the UEs with major angles that exceed the selected angular distance of the other UEs in the candidate MU-MIMO set.

7. The circuitry of claim 6, wherein the selected criteria further includes a signal to interference plus noise ratio (SINR) of the UE that exceeds a SINR of each of UEs with major angles that exceed a selected angular distance of other UEs in the candidate MU-MIMO set.

8. The circuitry of claim 7, further configured to iteratively add a plurality of selected UEs to the candidate MU-MIMO set based on the selected criteria.

9. The circuitry of claim 1, further configured to add a selected UE to a candidate MU-MIMO set based on selected criteria, wherein the selected criteria includes:
at least one AoA for a major path of the selected UE does not overlap with any AoAs for major paths of other UEs in the candidate MU-MIMO set; and
a total number of overlapping AoAs for the selected UEs of the candidate MU-MIMO set is less than a selected threshold number.

10. The circuitry of claim 9, further configured to determine when at least one AoA for a major path of the selected UE overlaps with any AoAs for major paths of other UEs using:
the AoA of the major paths of the selected UE and the other UEs; and
relative channel strengths of the major paths of the selected UE and other UEs.

11. The circuitry of claim 10, further configured to:
form a unique probing beam for each of the selected one or more UEs of the plurality of UEs or the one or more of the candidate MU-MIMO sets, wherein the unique probing beam is formed by:
constructing beamforming vectors for each AoA of each major path of the selected one or more UEs of the plurality of UEs;
constructing beamforming vectors for each AoA of each major path of UEs of one or more of the candidate MU-MIMO sets;
communicate the beamforming vectors to the selected one or more UEs of the plurality of UEs or the one or more of the candidate MU-MIMO sets using:
different antenna ports of the eNodeB;
time-division multiplexing (TDM);
frequency-division multiplexing (FDM); or
code-division multiplexing CDM; and
receive channel quality information from the selected one or more UEs of the plurality of UEs or the one or more of the candidate MU-MIMO sets.

12. The circuitry of claim 11, wherein:
each beamforming vector of the selected one or more UEs of the plurality of UEs is a unique major path for each of the selected one or more UEs; or each beamforming vector of the UEs of one or more of the candidate MU-MIMO sets is a unique major path for each of the UEs of one or more of the candidate MU-MIMO sets.

13. The circuitry of claim 1, further configured to:
determine ranking criteria for each of a plurality of UEs or the one or more candidate MU-MIMO sets, wherein the ranking criteria includes: a waiting time, a proportional fair metric, a predetermined ranking sequence, or a bandwidth rate of a UE or a candidate MU-MIMO set; and
select one or more UEs of the plurality of UEs or one or more of the candidate MU-MIMO sets with a highest individual ranking metrics or a highest sum of the ranking metrics.

14. A product including a non-transitory storage medium having stored thereon instructions that are adapted to be executed to implement a method of scheduling data transfer for a multiple user multiple-input and multiple-output (MU-MIMO) communications network, the method comprising:
receiving a sounding signal from a plurality of user equipment (UEs);
determining one or more major paths of the sounding signal from each of the plurality of UEs;
determining an angle of arrival (AoA) associated with each of the one or more major paths;
grouping the plurality of UEs into one or more candidate MU-MIMO sets, comprising candidate UEs, using the AoAs associated with each of the one or more major paths;
scheduling data transmissions for one or more of the candidate UEs in the candidate MU-MIMO set on one or more of the major paths of each of the candidate UEs; and
sending, to the one or more candidate UEs of the candidate Mu-MIMO sets, a probing beam on each of the major paths of the candidate UEs, wherein the candidate UE uses the probing beam to determine the channel quality information of the one or more major paths.

15. The product of claim 14, wherein the method further comprises determining a precoding direction for each remaining candidate UEs in the candidate MU-MIMO set for MU-MIMO transmissions to the remaining candidate UEs.

16. The product of claim 14, wherein the method further comprises beamforming one or more probe channels of the eNode B using the channel quality information.

17. The product of claim 16, wherein the method further comprises linearly combining two or more probe channels.

18. The product of claim 14, wherein the method further comprises determining a data rate of a data transfer between the eNode B and one or more of the candidate UEs based on the channel quality information.

19. The product of claim 14, wherein the method further comprises associating each of the plurality of UEs with a candidate MU-MIMO set.

20. The product of claim 14, wherein the method further comprises receiving, from the plurality of UEs, channel quality information of each of the major paths.

* * * * *